Figure 1:
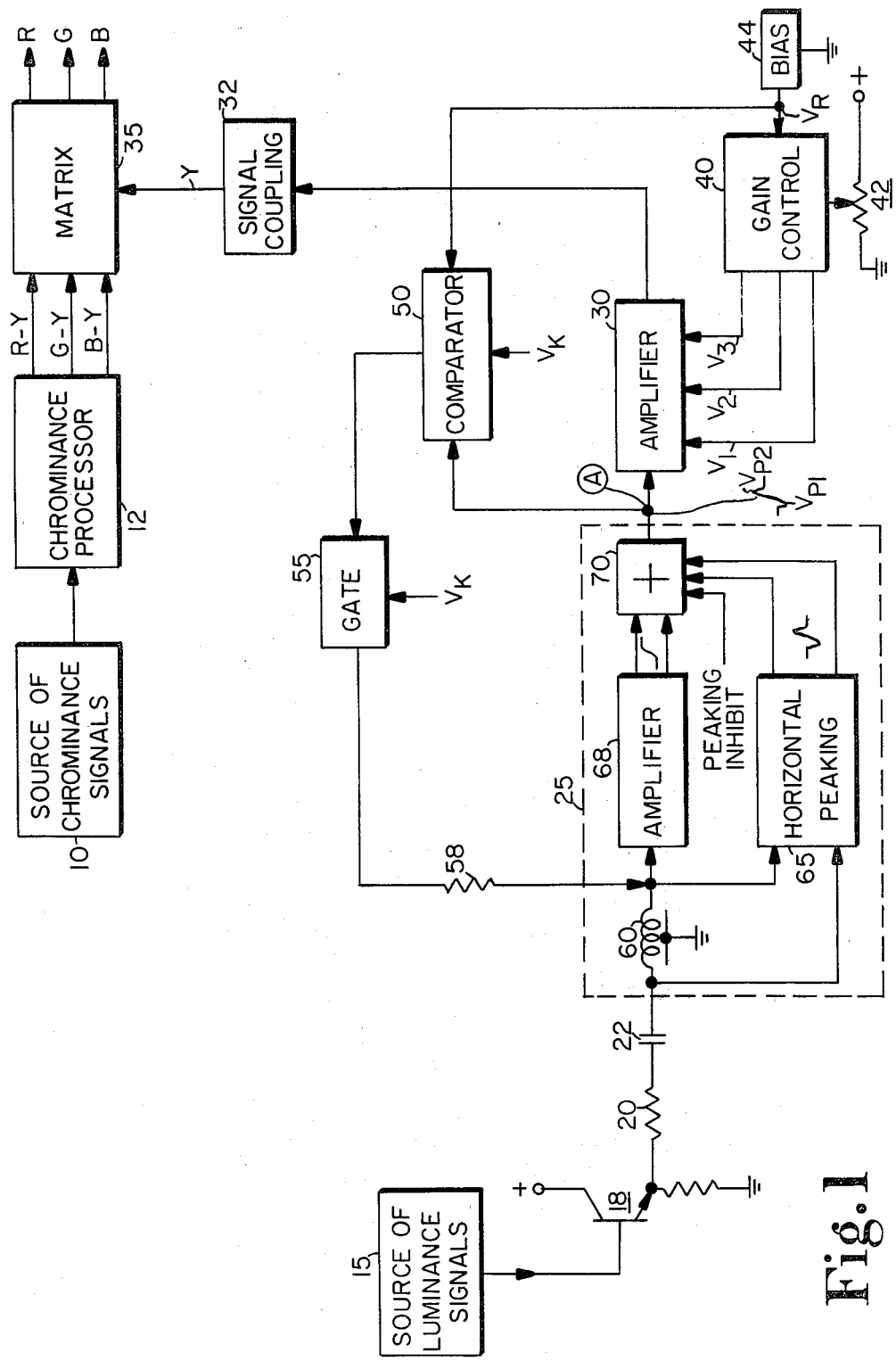

United States Patent [19]

Harwood et al.

[11] 4,386,370
[45] May 31, 1983

[54] CLAMPING ARRANGEMENT FOR A VIDEO SIGNAL PEAKING SYSTEM

[75] Inventors: Leopold A. Harwood, Bridgewater, N.J.; Robert L. Shanley, II, Indianapolis, Ind.

[73] Assignee: RCA Corporation, New York, N.Y.

[21] Appl. No.: 304,346

[22] Filed: Sep. 22, 1981

[51] Int. Cl.³ .............................................. H04N 5/14
[52] U.S. Cl. ...................................... 358/166; 358/37; 358/172
[58] Field of Search ........................ 358/36, 39, 37, 40, 358/160, 162, 167, 169, 166, 171, 172, 174

[56] References Cited

U.S. PATENT DOCUMENTS

| 4,110,790 | 8/1978 | Wheeler | 358/162 |
|---|---|---|---|
| 4,263,616 | 4/1981 | Lee | 358/166 |
| 4,296,435 | 10/1981 | d'Hautecourt | 358/166 |
| 4,316,210 | 2/1982 | Wharton | 358/166 |
| 4,316,214 | 2/1982 | Yost | 358/172 |
| 4,338,630 | 7/1982 | Engel | 358/172 |

OTHER PUBLICATIONS

Schematic circuit diagram (FIG. 31, pp. 39–40) for the RCA CTC-111 Color Television Receiver, as published in the RCA.
Television Service Data Bulletin (No. C-3, 1981) available from the RCA Consumer Electronics Division, Technical Publications.

Primary Examiner—Michael A. Masinick
Attorney, Agent, or Firm—Eugene M. Whitacre; Paul J. Rasmussen; Ronald H. Kurdyla

[57] ABSTRACT

In a video signal processing system, an input capacitor AC couples video signals to a DC coupled video signal path, and to a DC coupled peaking signal path for generating a peaking component which is combined with video signals from the video path to develop a peaked video signal. A feedback control voltage for controlling the DC level of the video signal is stored by the input coupling capacitor, and is DC coupled to both the video path and the peaking path in a manner to reduce the likelihood of a DC offset error when the video signal and peaking component are combined. In an embodiment, the control voltage is coupled to the storage capacitor via a delay line included in the video path and which is coupled across the differential inputs of a differential amplifier with which the delay line coacts to generate the peaking component.

16 Claims, 3 Drawing Figures

CLAMPING ARRANGEMENT FOR A VIDEO SIGNAL PEAKING SYSTEM

This invention concerns apparatus for maintaining a desired relationship between a video signal having a DC level which is controlled and a peaking component derived from the video signal, so as to reduce undesired DC offset errors which can produce distortions in a peaked video signal produced when the controlled video signal and peaking component are combined.

It is known that the response of a video signal processing system, such as found in a television receiver, can be subjectively improved by increasing the slope or "steepness" of video signal amplitude transitions. In this regard the video signal response can be improved by generating a signal "preshoot" immediately before an amplitude transition, and a signal "overshoot" immediately after the amplitude transition, so that black-to-white and white-to-black amplitude transitions are accentuated. This result is commonly achieved by developing a peaking signal component which is added to the video signal to produce a peaked video signal with accentuated amplitude transitions. An arrangement for developing such a peaked video signal in response to a peaking signal component is shown, for example, in a copending U.S. patent application Ser. No. 255,982 of W. E. Harlan, U.S. Pat. No. 4,350,955, titled "Self-Limiting Video Signal Peaking Circuit".

It is desirable to maintain a given relationship between the DC level of the video signal and the DC level of the peaking component which is combined with the video signal. A mismatch (i.e., an offset error) between the DC levels of the combined video signal and peaking component can impair the desired gray scale response of the peaked video signal, whereby the light-to-dark image information content of a picture reproduced in response to the peaked video signal may not be reproduced faithfully. In addition, such a DC level mismatch can adversely affect the peaking characteristics of the peaked video signal such that an asymmetrically peaked video signal results rather than a desired symmetrically peaked video signal. Illustratively, a DC level mismatch can produce an excessively large "overshoot" peaking component relative to the "preshoot" peaking component, or it can cause peaking in one direction to be absent entirely.

A video signal peaking and DC control network according to the present invention is arranged to significantly reduce the likelihood of a DC offset error between the video signal and the peaking component to be combined with the video signal. For this purpose the network makes economical use of circuit components, and is particularly suitable for construction in an integrated circuit in large part.

The disclosed network includes a video signal path and a peaking path including a network for generating a peaking component which is combined with signals from the video path to produce a peaked luminance signal. Video signals are AC coupled to inputs of the video signal and peaking paths via a capacitor. A control voltage for maintaining a desired condition of the black reference level of the peaked video signal is applied to the inputs of the video and peaking paths and is stored by the input AC coupling capacitor.

In accordance with a feature of the invention, the described network is included in a color television receiver including a source of chrominance signals, and video signals are DC coupled from an input coupling capacitor to a circuit which combines the peaked video signals with the chrominance signals to produce a color image representative signal.

In accordance with another feature of the invention, a video signal delay line is coupled from the input AC coupling and storage capacitor to the input of the video signal path. The peaking component is generated by means of a differential amplifier with differential inputs coupled across the delay line, and an output for providing the peaking component.

In accordance with a further feature of the invention, the differential amplifier provides complementary phased peaking signals at complementary outputs thereof. The video signal path also includes a differential amplifier responsive to the AC coupled video signal for providing complementary phased video signals at complementary outputs, which are combined with the complementary phased peaking components to produce complementary phased peaked video signals.

In the drawing

Figure 2:
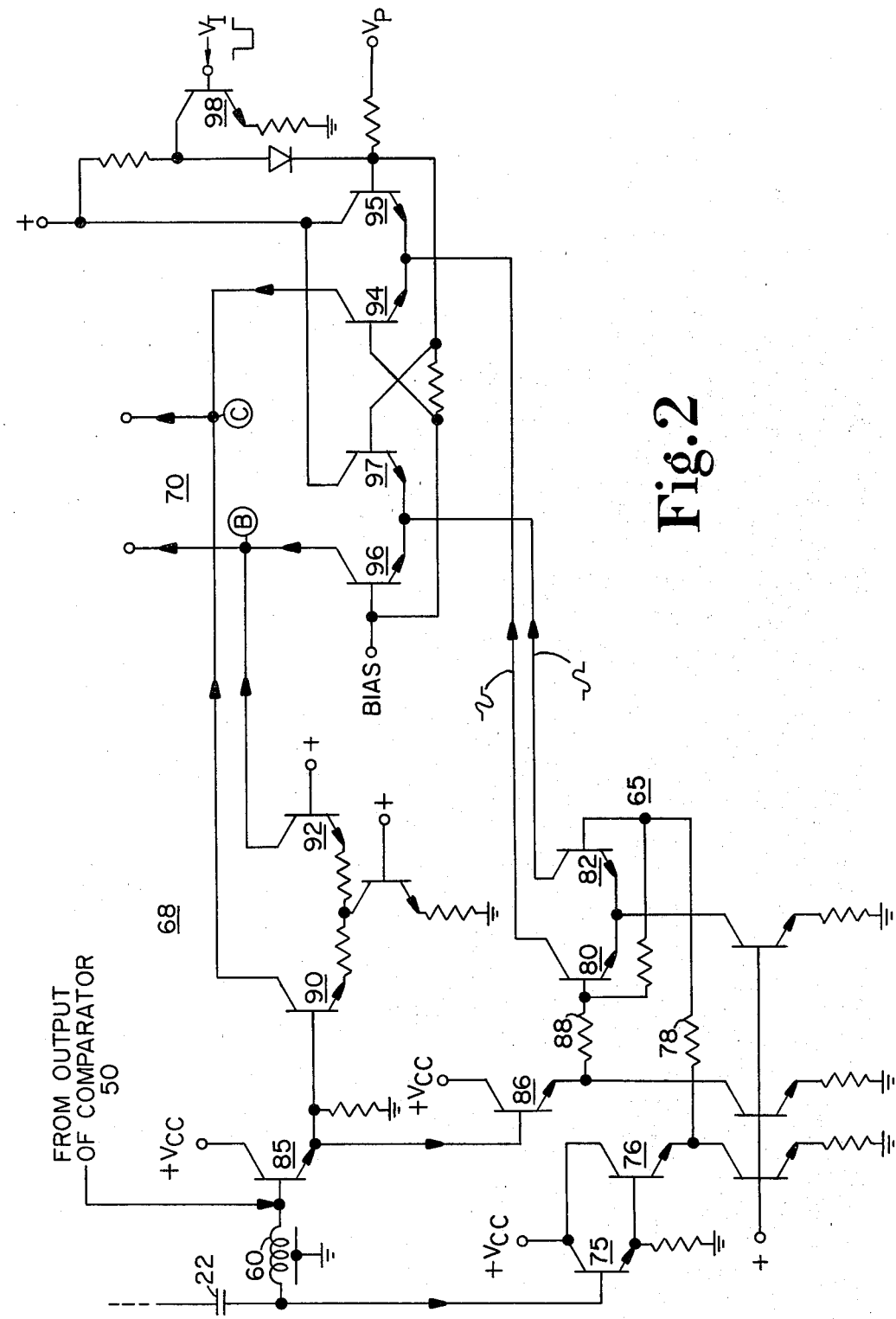
Figure 3:
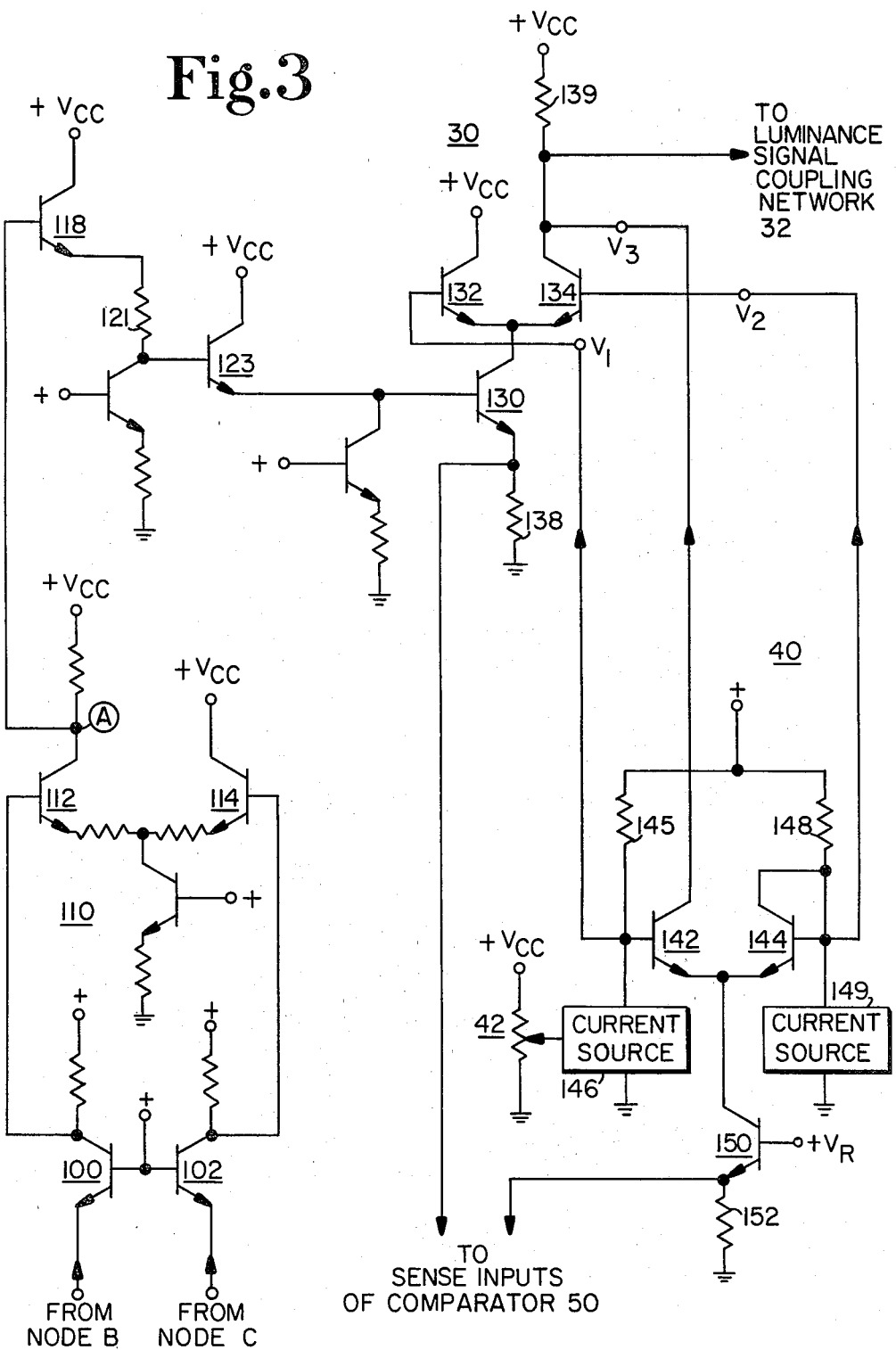

FIG. 1 shows a diagram of a portion of a color television receiver, partly in block diagram form and partly in schematic circuit diagram form, incorporating an embodiment of the invention; and FIGS. 2 and 3 show circuit details of portions of the arrangement of FIG. 1.

In FIG. 1, chrominance signals from a source 10 are supplied to a chrominance signal processor 12 for developing R-Y, G-Y and B-Y color difference signals.

Luminance signals from a source 15 are coupled via an emitter follower transistor 18, a resistor 20, and an AC signal coupling capacitor 22 to a luminance signal processing network 25, including video signal peaking circuits as will be discussed. Peaked luminance signals from network 25, appearing at a node A, are coupled via a gain controlled amplifier 30 and a signal coupling network 32 to a matrix amplifier 35. Matrix 35 combines the color difference signals with the peaked luminance signal (Y) to produce color image representative output signals R, G and B.

Amplifier 30 comprises a differential amplifier which is gain controlled in response to differential gain control voltages $V_1$ and $V_2$. These control voltages are derived from a gain control network 40 in accordance with the setting of a gain control potentiometer 42 operatively associated with network 40. A bias network 44 serves to establish the DC operating bias of gain control network 40. Network 40 additionally supplies a DC compensation voltage $V_3$ to amplifier 30, for maintaining the DC output level of amplifier 30 substantially constant as amplifier 30 is gain controlled in response to voltages $V_1$ and $V_2$. Gain control network 40 is described in greater detail in a copending U.S. patent application Ser. No. 296,865 of L. A. Harwood, et al. titled "Circuit for Linearly Gain Controlling a Differential Amplifier".

The luminance signal supplied by source 15, and as developed at node A, comprises periodic image intervals separated by image blanking intervals. Each blanking interval comprises a horizontal sync pulse interval, and a reference interval (i.e., the so-called "back porch" interval) during which a video signal black reference level occurs. The black reference level of the luminance signal processed by amplifier 30 is maintained at a desired value by means of a black level clamping network comprising a keyed comparator 50 including an associated output gating network 55, a resistor 58, and input AC coupling capacitor 22 which serves to store an output control voltage developed by comparator 50.

Comparator 50 is keyed to operate in response to timing signal $V_K$. When operating, comparator 50 compares the black reference level of the peaked luminance signal then appearing at node A with a reference voltage $V_R$ derived from bias source 44. An output control voltage from comparator 50 is representative of the difference between the black reference level of the luminance signal and reference voltage $V_R$. Gate 55 also conducts during the black level reference intervals of the luminance signal in response to keying signal $V_K$ for conducting the control voltage via resistor 58 and a delay line 60 to input AC coupling capacitor 22, which stores the control voltage. The control voltage exhibits a magnitude and sense for modifying the black reference level of the luminance signal so that the difference between the black reference level and reference voltage $V_R$, as sensed by comparator 50, is reduced. By this closed loop control action the black reference level of the luminance signal is maintained at a desired value. Additional information concerning the structure and operation of the described black reference level control network including comparator 50 is found in a copending U.S. patent application Ser. No. 296,864 of R. L. Shanley, II, et al. titled "Signal Gain Control with DC Compensation," hereby incorporated by reference.

Delay line 60 serves to equalize the signal transit time of the luminance signal with respect to the chrominance signals so that the luminance and chrominance signals are applied to matrix 35 in proper time relationship. Delay line 60 is a wideband linear phase device throughout the luminance signal bandwidth of approximately 4.0 MHz, and also cooperates with circuits in a DC coupled, differential input horizontal peaking network 65 for producing a horizontal peaking signal component, as will be discussed in greater detail with respect to the circuit of FIG. 2. Complementary phased wideband luminance components from the output of an amplifier 68 DC coupled to an output terminal of delay line 60 are combined with complementary phased horizontal peaking components from network 65 in a signal combiner 70. The peaked output luminance signal from combiner 70, as indicated by the waveform at node A, includes a peaking preshoot component $V_{p1}$ and a peaking overshoot component $V_{p2}$ for accentuating amplitude transitions of the luminance signal.

The peaking signal output coupling path is inhibited in response to a PEAKING INHIBIT control signal during the luminance signal reference intervals when comparator 50 operates to generate the black level control voltage. Inhibiting the peaking path in this manner serves to stabilize the black level feedback control loop and prevents the comparator from responding to spurious signals including noise, which would otherwise be enhanced by the peaking network and adversely affect the control voltage developed by the comparator. Additional details concerning this feature are disclosed in a copending U.S. patent application of R. L. Shanley, II, et al., Ser. No. 304,345 "COMPENSATED CLAMPING CIRCUIT IN A VIDEO SIGNAL PEAKING SYSTEM".

Delay line 60 exhibits a negligible impedance at DC, and serves to couple the DC black level control signal from comparator 55 to charge storage capacitor 22. Thus the stored black level control voltage is applied via delay line 60 both to the luminance signal processed in the wideband luminance signal processing path of processor 25 via the input of amplifier 68, and to the peaking signal path via the differential inputs of horizontal peaking network 65 in a manner which advantageously prevents the control signal from affecting the peaking component as will be discussed.

As will be seen from the description of the circuit shown in FIG. 2, this arrangement advantageously assures that the DC level of the wideband luminance signal from amplifier 68 and the DC level of the peaking component from network 65 exhibit desired values when these signals are combined in combiner 70. Specifically, the DC determinative black level of the luminance signal is controlled, and the controlled luminance signal is combined with the peaking component, in a manner which significantly reduces the likelihood that an undesired DC offset will exist between the wideband luminance signal and the peaking component which are combined. Accordingly, the likelihood of a DC error in the peaked luminance signal and an associated error in the gray scale content of a reproduced image are significantly reduced. In addition, the desired peaking response (e.g., symmetrical peaking) of the peaked luminance signal is preserved by reducing the chance of a DC offset error which would otherwise distort the signal peaking response (e.g., by causing an asymmetrical peaking response to be developed when the wideband and peaking signals are combined with a DC offset error).

The described luminance signal processing and control arrangement is DC coupled from the output of coupling capacitor 22 to the input of matrix 35. The system advantageously requires only one capacitor for input AC coupling and control voltage storage, namely capacitor 22, and requires a minimum number of external terminals when the arrangement is fabricated as an integrated circuit. In this regard it is noted that the arrangement of FIG. 1 can readily be constructed as an integrated circuit, with the exception of capacitor 22, delay line 60 and gain control potentiometer 42. In such case two external integrated circuit terminals would be required for coupling the input and output terminals of delay line 60 to amplifier 68 and peaking network 65. One of these terminals would be utilized for coupling capacitor 22 to the integrated circuit. Accordingly, the described arrangement makes economical use of the limited number of integrated circuit terminals available for external connections.

FIG. 2 shows details of luminance signal processor 25.

The wideband luminance as applied to the input of delay line 60 is coupled to one input of a differential amplifier comprising transistors 80 and 82 (comprising peaking network 65 of FIG. 1) via emitter follower transistors 75, 76 and a resistor 78. Delayed luminance signals from the output of delay line 60 are coupled to another input of differential amplifier 80, 82 via emitter follower transistors 85, 86 and a resistor 88. Thus delay line 60 is coupled between the base inputs of transistors 80 and 82. The delayed wideband luminance signal from the output of delay line 60 is also coupled via follower transistor 85 to a differential amplifier including transistors 90 and 92 (comprising amplifier 68 of FIG. 1). Differential amplifier 90, 92 is included in a wideband luminance signal processing path of luminance processor 25, and differential amplifier 80, 82 is included in a horizontal peaking path of processor 25.

Delay line 60 provides a signal delay on the order of 140 nanoseconds so that the amplitude-versus-frequency response of the horizontal peaking network has a peak amplitude response at approximately 1.8 MHz. Since the output of delay line 60 is terminated by the high input impedance of transistor 85, the delay line output is essentially unterminated relative to its characteristic impedance whereby the delay line operates in a voltage reflective mode with a reflection coefficient of approximately unity. The input of delay line 60 is terminated in its characteristic impedance by means of resistor 20 shown in FIG. 1.

A delayed luminance signal is developed at the base input of transistor 80. A luminance signal and a reflected and twice delayed luminance signal are developed as a sum at the base input of transistor 82. The signals developed at the base electrodes of transistors 80 and 82 cause differential amplifier 80, 82 to develop preshoot and overshoot peaking signal components in the complementary phased collector circuits of transistors 80 and 82.

A circuit including transistors 94–97 comprises signal combiner 70. Emitter coupled transistors 94, 95 receive the peaking component from transistor 80, and emitter coupled transistors 96, 97 receive the complementary phased peaking component from transistor 82. The peaking component from transistor 82 is combined with the wideband luminance signal from transistor 92 at a node B, and the peaking component from transistor 80 is combined with the wideband luminance signal from transistor 90 at a node C. Accordingly, mutually complementary phased horizontally peaked luminance signals appear at nodes B and C. Additional information concerning the operation of a horizontal peaking component generator of the type described (i.e., including delay line 60 and differential amplifier 80, 82) is found in the aforementioned copending U.S. patent application Ser. No. 255,982 of W. E. Harlan, now U.S. Pat. No. 4,350,995.

The magnitude of the peaking component can be controlled by controlling the conduction of transistors 94–97, such as by means of a peaking control voltage $V_p$. Control voltage $V_p$ can be derived from a manually adjustable, viewer controlled potentiometer. Alternatively, automatic peaking control can be accomplished in response to a control voltage derived as described in the aforementioned U.S. patent application of W. E. Harlan.

The peaking signal coupling path is inhibited, as discussed in connection with FIG. 1, in response to an inhibit control voltage $V_I$ which controls the conduction of a transistor 98 and a diode 99 to thereby render peaking signal coupling transistors 94 and 96 nonconductive during the luminance signal black level control intervals.

The black reference level of the wideband luminance signal as processed by amplifier 90, 92 and as developed at signal combining nodes B and C is established in response to the output control voltage from comparator 50 as stored on capacitor 22. This black level control voltage is applied to the base input of transistor 90 via follower transistor 85.

The black level control voltage is also applied to the base inputs of peaking differential amplifier transistors 80 and 82 via first and second symmetrical coupling paths. The first coupling path comprises emitter follower transistors 85, 86 and resistor 88, for coupling the control voltage to the base of transistor 80. The second coupling path comprises emitter follower transistors 75, 76, resistor 78, and delay line 60 for coupling the control voltage to the base of transistor 82. In this regard it is noted that delay line 60 exhibits a negligible impedance at DC. Accordingly, the DC base voltages of follower transistors 75 and 85, and thereby the differential base input DC voltages of peaking amplifier transistors 80 and 82, are substantially equal and track with changes in the level of the black reference control voltage from comparator 50.

The DC base voltages of transistors 80 and 82 are substantially equal. The common mode rejection characteristic of differential amplifier 80, 82 advantageously prevents amplifier 80, 82 from responding to common mode input signals, including the equal DC base voltage variations caused by variations of the black level control signal. Thus the varying black level control voltage does not upset the desired DC value of the peaking component generated by amplifier 80, 82. As a result, the peaked luminance signal resulting from the summation of the peaking signal and the luminance signal has a proper DC level. In this regard it is noted that the peaking component preferably should have a DC value of zero. This is achieved in the described arrangement by means of the common mode input rejection of peaking amplifier 80, 82, by means of input AC coupling via capacitor 22 (which also advantageously serves to store the black level control voltage), and by means of the symmetrical coupling paths between delay line 60 and the differential inputs of amplifier 80, 82.

The described black level control arrangement provides an additional advantage when, as in this case, the input circuit of luminance processor 25 comprises a differential amplifier including a pair of emitted coupled, base input transistors 90 and 92. A differential amplifier of this type exhibits a non-linear input-versus-output signal transfer response over much of the operating range of the differential amplifier. A luminance signal will produce gray-scale errors in a reproduced image if the luminance signal is processed non-linearly. Such errors can be eliminated by compensating the differential amplifier so that it operates linearly over a wide conduction range, by applying luminance signals with relatively small peak-to-peak amplitude variations to the differential amplifier to assure that the luminance signal will be processed within the linear operating region of the differential amplifier even when the black reference DC level of the luminance signal shifts (e.g., due to the effects of AC coupling and signal duty cycle changes), or by other means.

The luminance signal black level clamping action of comparator 50 serves to predictably set the black reference level relative to the transfer characteristic of differential amplifier 90, 92 so that normally expected peak-to-peak variations of the luminance signal picture information (i.e., variations from light to dark picture information) remain within the linear operating region of the differential amplifier. This permits relatively large amplitude, wide dynamic range signals to be applied to the differential amplifier. That is, the dynamic range of the input luminance signal can be made large enough to take full advantage of the linear operating region of amplifier 90, 92. The use of such signals with a wide dynamic range also advantageously results in a good signal-to-noise response.

In the same vein, the described arrangement also serves to maintain the operation of peaking differential amplifier 80, 82 within a linear region, thereby preventing distortion of the peaking component.

The complementary phased video signal and peaking signal outputs produced at nodes B and C are combined to produce a signal phase peaked luminance signal by means of a differential amplifier 112, 114 as shown in FIG. 3. This combination of complementary phased signals also assists to significantly reduce the likelihood of a DC offset error in the combined peaked video signal due to common mode effects such as power supply variations, for example.

FIG. 3 shows additional details of amplifier 30 and gain control network 40 of FIG. 1.

In FIG. 3, the complementary phased peaked luminance signals from nodes B and C of FIG. 2 are applied to a network 110 including input common base transistors 100 and 102 which receive the luminance signals from nodes B and C and which apply these signals to differentially connected transistors 112 and 114, respectively. A single-ended peaked luminace signal is developed in the collector output circuit of transistor 112, and is coupled via transistor 118, resistor 121 and emitter follower transistor 123 to a transistor 130 included in amplifier 30.

Amplifier 30 comprises differentially connected transistors 132 and 134. Transistor 130 serves as a current source for transistors 132 and 134 together with an emitter resistor 138, and supplies the luminance signal to be amplified as well as operating bias current to amplifier transistors 132 and 134. Amplified peaked luminance signals are developed across a collector load resistor 139 and supplied to luminance signal coupling network 32 shown in FIG. 1. Amplifier transistors 132, 134 are differentially gain controlled in response to differential gain control voltages $V_1$ and $V_2$ provided from gain control circuit 40 as will be described. A DC compensation voltage $V_3$ also provided from circuit 40 is applied to the collector output of transistor 134 for maintaining the quiescent DC collector voltage and current of transistor 134 substantially constant as amplifier transistors 132 and 134 are gain controlled.

Gain control circuit 40 comprises a differentially connected current splitter including a transistor 142 and a diode-connected transistor 144. Symmetrical bias networks comprising a resistor 145 and a current source 146, and a resistor 148 and a current source 149, are respectively associated with transistor 142 and diode-connected transistor 144. Differential gain control voltages $V_1$ and $V_2$ are varied by varying the conduction of current source 146 in response to the setting of gain control potentiometer 42. The bias of gain control circuit 40 is a function of DC operating supply current supplied to transistor 142 and diode 144 from a current source including a transistor 150 and an associated emitter resistor 152. Transistor 150 is biased by means of a stable DC reference voltage $V_R$ derived from bias source 44 shown in FIG. 1.

The described DC compensation of amplifier 30, whereby the DC output level of amplifier 30 remains substantially constant as amplifier 30 is gain controlled, is maintained as long as the bias currents provided by current source 130 of amplifier 30 and by current source 150 of gain control circuit 40 exhibit a predetermined relationship (in this case equality). The relationship is maintained by means of the control loop including comparator 50, which also serves to establish the black reference level of the video signal as noted previously.

Specifically, during each black reference interval comparator 50 senses and compares the DC voltage developed across respective emitter resistors 138 and 152 of current source transistors 130 and 150. As seen from the description of FIGS. 1 and 2, the output control voltage from comparator 50 is representative of the difference between these sensed voltages, and is used to modify the charge on storage capacitor 22 so as to reduce the difference between these voltages. Thus in this example the control loop including comparator 50 also serves to substantially equalize the DC bias currents provided by current source transistors 130 and 150 so that the desired DC compensation of gain controlled amplifier 30 is preserved, as described in greater detail in the aforementioned copending U.S. patent application Ser. No. 296,864 of R. L. Shanley, II, et al.

What is claimed is:

1. A video signal processing system comprising:
    a source of video signals comprising image intervals and blanking intervals including a reference interval containing a reference level;
    a video signal path having a signal input;
    a peaking signal path having a signal input; and including means for generating a signal peaking component;
    an input circuit including a capacitor for AC coupling video signals from said source to said inputs of said video signal path and said peaking signal path;
    a combining network for combining video signals from said video path with said peaking component from said peaking path to produce a peaked video signal;
    a utilization network responsive to said peaked video signal;
    a control network for sensing said video signal reference level during said reference intervals to develop an output control voltage in response to the sensed condition of said video signal reference level; and
    means for coupling said control voltage to said input AC coupling capacitor at said inputs of said video signal and peaking paths, with a sense for modifying the charge stored on said capacitor in a direction to maintain a desired condition of said video signal reference level.

2. A system according to claim 1, wherein said system is DC coupled from the output of said AC coupling capacitor to said utilization network.

3. A system according to claim 2 wherein said system includes a source of chrominance signals; and
    said utilization means comprises means for combining said peaked video signal with said chrominance signals to produce color image representative signals.

4. A system according of claim 1, and further comprising
    a signal delay line DC coupled between the output of said coupling capacitor and said input of said video signal path; and wherein
    said delay line is DC coupled to said means for generating said peaking component.

5. A system according to claim 4, wherein said means for generating said peaking component comprises a differential amplifier with differential inputs and an output;
    said delay line is coupled across said differential inputs; and
    said peaking component is developed at said output.

6. A system according to claim 5, wherein said video signal path comprises an input differential amplifier with a differential input for receiving said video signal.

7. A system according to claim 4, wherein
said means for generating said peaking component comprises a first differential amplifier with differential inputs coupled across said delay line, and complementary phased outputs for providing complementary phased peaking components;
said video signal path comprises a second differential amplifier response to said AC coupled video signal for providing complementary phased video signals at complementary phased outputs; and
said combining network differentially combines signals from said complementary phased outputs of said first and second differential amplifiers for providing a single phased peaked video signal.

8. A system according to claim 1 and further comprising
a video signal delay line DC coupled between said input coupling capacitor and said input of said video signal path; and wherein
said means for generating said peaking component comprises a differential amplifier with differential inputs coupled across said delay line, and an output for providing said peaking component;
said delay line is DC coupled between said differential inputs; and
said control voltage is coupled to the output terminal of said delay line at said input of said video signal path.

9. A system according to claim 8, wherein said delay line is coupled between said differential inputs via symmetrical coupling networks.

10. A television signal processing system comprising:
a source of chrominance signals;
a source of luminance signals comprising image intervals and blanking intervals including a reference interval containing a reference level;
an AC signal coupling capacitor with an input terminal coupled to said source of luminance signals, and an output terminal; and
a DC coupled luminace signal processing network comprising
a luminance signal path having an input coupled to said capacitor output;
a peaking signal path having an input coupled to said capacitor output, and including means for generating a signal peaking component;
a combining network for combining luminance signals from said luminance path with said peaking component from said peaking path to produce a peaked luminace signal;
a matrix for combining said peaked luminance signals with said chrominance signals to produce color image representative signals;
a control network for sensing said reference level during said reference intervals to develop an output control voltage in response to the sensed condition of said reference level; and
means for coupling said control voltage to said output of said coupling capacitor, at said inputs of said luminance signal and peaking signal paths, with a sense for modifying the charge stored on said coupling capacitor in a direction to maintain a desired condition of said luminance signal reference level.

11. A system according to claim 10, and further comprising
a video signal delay line DC coupled between said output of said coupling capacitor and said input of said luminance signal path; and wherein
said means for generating said peaking component comprises a differential amplifier with differential inputs and an output for providing said peaking component;
said delay line is DC coupled between said differential inputs; and
said control voltage is coupled to the output terminal of said delay line at said input of said luminance signal path.

12. A system according to claim 10 or 11, wherein
said control network comprises a comparator operative during said reference intervals for comparing said reference level with a reference voltage to develop an output control voltage representative of the difference between said reference level and said reference voltage; and
said control voltage is coupled to said coupling capacitor for modifying the charge stored on said capacitor in a direction to reduce said difference.

13. A system according to claim 12 and further comprising
an amplifier responsive to said peaked luminance signal and having associated bias means for establishing the DC bias of said amplifier means, said DC bias of said amplifier means being a function of said signal reference level;
a gain control circuit having associated bias means for establishing the DC bias of said gain control circuit, said gain control circuit providing a gain control signal for controlling the signal gain of said amplifier and also providing a DC compensation signal for said amplifier such that the DC output level of said amplifier is compensated to remain substantially constant as said amplifier is gain controlled in response to said gain control signal; and wherein
said comparator compares a voltage representative of said DC bias of said amplifier with a voltage representative of said DC bias of said gain control circuit.

14. A video signal processing system comprising:
a source of video signals;
amplifier means, having an input and an output, for amplifying said video signal;
peaking means, having an input and an output, for producing a video signal peaking component;
means for coupling said inputs of said amplifier means and said peaking means to a common input point to which said video signals are applied;
means for combining output signals from said amplifier means and said peaking means to produce a peaked video signal;
control means responsive to a d.c. component of the video signal processed by said amplifier means, for producing a control signal for maintaining said d.c. component at a predetermined level; and
means for applying said control signal to said common input; and wherein
said peaking means includes d.c. compensation means for maintaining the d.c. level of said video peaking component at a desired level substantially independent of said control signal.

15. A system according to claim 14, wherein:

said d.c. compensation means includes a differential amplifier having differential inputs each of which is coupled to receive said control signal developed at said common input.

16. A system according to claim 14, wherein said peaking means comprises:

a delay line coupled between said video signal source and said common input, said delay line having first and second terminals between which said video signal is delayed; and a differential amplifier having differential inputs respectively coupled to said first and second delay line terminals for receiving said control signal developed at said common input.

* * * * *